(12) United States Patent
Streete et al.

(10) Patent No.: US 9,929,926 B1
(45) Date of Patent: Mar. 27, 2018

(54) CAPACITY MANAGEMENT SYSTEM AND METHOD FOR A COMPUTING RESOURCE

(71) Applicant: VCE Company, LLC, Richardson, TX (US)

(72) Inventors: Jonathan P. Streete, San Jose, CA (US); Samir Mehra, Lexington, MA (US); Deborah C. Umbach, Sudbury, MA (US)

(73) Assignee: VCE IP Holding Company LLC, Richardson, TX (US)

( * ) Notice: Subject to any disclaimer, the term of this patent is extended or adjusted under 35 U.S.C. 154(b) by 113 days.

(21) Appl. No.: 14/575,532

(22) Filed: Dec. 18, 2014

(51) Int. Cl.
*H04L 12/26* (2006.01)

(52) U.S. Cl.
CPC ........ *H04L 43/0876* (2013.01); *H04L 43/062* (2013.01)

(58) Field of Classification Search
CPC .......................... H04L 43/0876; H04L 43/062
See application file for complete search history.

(56) References Cited

U.S. PATENT DOCUMENTS

| | | | |
|---|---|---|---|
| 8,738,972 B1* | 5/2014 | Bakman | G06F 11/0712 714/47.1 |
| 2006/0265713 A1* | 11/2006 | Depro | G06F 11/3409 718/104 |
| 2010/0110077 A1* | 5/2010 | Grossman | G06Q 10/06 345/440 |
| 2011/0301887 A1* | 12/2011 | Sanchez Loureda | G01D 3/032 702/61 |
| 2014/0095696 A1* | 4/2014 | Sala | G06F 11/3409 709/224 |

* cited by examiner

*Primary Examiner* — Arvin Eskandarnia
*Assistant Examiner* — Juan C Turriate Gastulo
(74) *Attorney, Agent, or Firm* — Polsinelli PC

(57) ABSTRACT

According to one aspect of the present disclosure, a capacity management system includes an application that is executable by a computing unit to monitor a consumption level of a computing resource, and identify each instance in which the consumption level crosses beyond at least one specified threshold level. Each instance defines a usage event which is then stored in the storage medium by the application. Each usage event is then stored in a computer-readable storage medium.

14 Claims, 6 Drawing Sheets

CAPACITY MANAGEMENT SYSTEM AND METHOD FOR A COMPUTING RESOURCE

TECHNICAL FIELD

Aspects of the present disclosure relate to computing devices and, in particular, to a capacity management system and method for a computing resource.

BACKGROUND

Computing resources, which may include storage arrays and network resources used by enterprises, such as corporations and universities, are often provided by multiple computing devices (e.g., hardware resources) that function in a collaborative manner to meet the computing resource needs of the enterprise. Business organizations often purchase additional resources to keep up with the varying demands of their business needs. The purchase of too many additional resources often yields excess capacity representing wasted investment and lost opportunity cost from over-investment. Conversely, the purchase of too few additional resources may yield insufficient capacity that can be damaging for business operations in numerous ways including handling Web traffic to a company Website, managing internal application demand, inhibiting pursuit of opportunities, responding to competition, and other concerns. Consequently, information technology (IT) organizations within these organizations may invest in tools to help plan for an appropriate capacity.

SUMMARY

According to one aspect of the present disclosure, a capacity management system includes an application that is executable by a computing unit to monitor a consumption level of a computing resource, and identify each instance in which the consumption level crosses beyond at least one specified threshold level. Each instance defines a usage event which is then stored in the storage medium by the application. Each usage event is then stored in a computer-readable storage medium.

BRIEF DESCRIPTION OF THE DRAWINGS

The various features and advantages of the technology of the present disclosure will be apparent from the following description of particular embodiments of those technologies, as illustrated in the accompanying drawings. It should be noted that the drawings are not necessarily to scale; however the emphasis instead is being placed on illustrating the principles of the technological concepts. Also, in the drawings the like reference characters refer to the same parts throughout the different views. The drawings depict only typical embodiments of the present disclosure and, therefore, are not to be considered limiting in scope.

DETAILED DESCRIPTION

Figure 1:
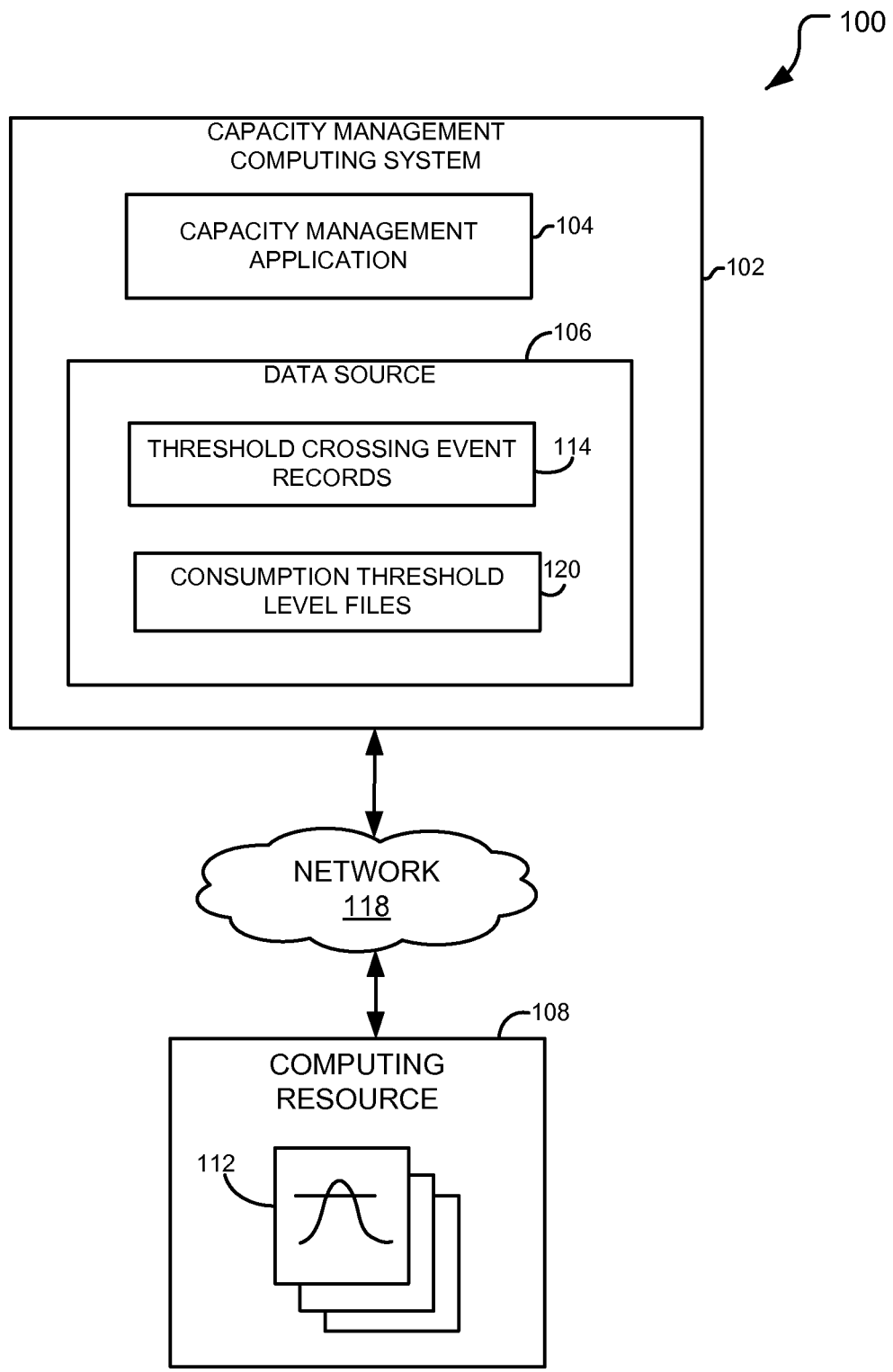
FIG. 1 illustrates an example capacity management system according to one embodiment of the present disclosure.

Embodiments of the present disclosure provide a system for monitoring consumption levels for a computing resource using a technique that logs (e.g., records) threshold crossing events for the computing resource in a manner that more accurately portrays actual trends than has been heretofore been provided by conventional capacity monitoring tools. Whereas conventional capacity monitoring tools monitor instantaneous consumption levels, which may require compression of the monitored data that often results in a loss of fidelity of information for historical analysis, embodiments of the present disclosure provide a system that monitors threshold crossing events, which may require less memory storage, and provide for enhanced historical visibility of the consumption levels of the computing resource for more accurate capacity planning.

In an ideal world, consumption of computing resources, and particularly interdependent computing resources of distributed computing systems, would match the environment's availability at least most of the time. In real world scenarios, however, consumption (e.g., consumption) of the computing resource is variable in nature, thus requiring that a balance between over-allocation of resources and under-allocation of resources is maintained. Accurate measurement of consumption is an important element to ensure this balance is maintained, but accurately determining consumption trends in an environment where consumption can vary substantially across multiple differing time periods (e.g., hours, days, weeks, months, quarters, and years, etc.) is often difficult and error prone. To solve this problem, conventional capacity monitoring systems compress the data, thus removing details that may be critical in recognizing trends. Consumption levels of a computing resource, such as storage input/output operations per second (IOPS), an amount of compute memory, compute processing cycles, network bandwidth, operating temperature, and power consumption, may be useful parameters to track; however, storing this information generally requires a significant amount of memory that may be prohibitively expensive for historical analysis.

Conventional approaches to capacity management involve measuring instantaneous consumption levels of the computing resource on either a regular schedule or at random times, and recording those results for historical trend analysis. A statistical analysis of the historical data may identify trends, but in many cases, random noise caused by natural variance in consumption often delivers false indicators, and can obscure any real trends in usage. Furthermore, summarized compression of the data, reduces fidelity making accurate trend analysis more complex.

For example, the technique of monitoring instantaneous measurements assumes that there is little variation in load over short-term and long-term periods, and that consumption generally increases in at least a somewhat linear fashion, such that growth identifiers can be easily extrapolated from current consumption usage using a mathematical (e.g., regression) analysis of consumption growth. In reality, however, consumption of computing resources often varies to a relatively large degree (e.g. is lumpy) over time so that any mathematical model derived from the value of consumption usage may be meaningless. Additionally, growth of the usage of computing resources do not occur in linear fashion, so while it may be possible to find a trajectory in any regressed consumption measurement, that trajectory is likely meaningless and could lead to miscalculations of the actual allocation needs for the computing resource.

Additionally, administrators of a computing resource may be required to address "black-swan" events, such as when additional capacity is used when a new application is brought online. Most administrators will invest in a conservative manner by over-provisioning resources, but without a tool to measure consumption with reasonable accuracy, they never get an opportunity to learn from such black-swan events so that they can be more accurate in their expectations for subsequent, future events.

FIG. 1 illustrates an example capacity management system 100 according to the teachings of the present disclosure. The system 100 includes a capacity management computing system 102 having a capacity management application 104 and a data source 106. The capacity management application 104 communicates with a computing resource 108 to monitor one or more consumption levels of the resource 108, identify threshold crossing events 112 comprising those consumption level levels that exceed one or more specified threshold levels, and log the threshold crossing events 112 in the threshold crossing event records 114 in the data source 106. The capacity management application 104 may then analyze the logged threshold crossing event records 114 that have accumulated over a specified period of time to determine trends associated with the monitored consumption levels, and in some cases, perform one or more remedial actions to compensate for changes in the trends associated with the monitored consumption levels.

The computing resource 108 may include any type and number of computing devices. For example, the computing devices may include laptop or notebook computers, workstations, personal digital assistants (PDAs), tablet computers, and the like, and/or complex computing structures, such as clusters, unified computing systems, fabric-based computing systems, and dynamic infrastructures. The computing devices may also include other communication devices, such as switches, routers, firewall appliances, or other communication device that facilitates communication among multiple other computing devices. The computing resource may also form a portion of a distributed computing system, such as a storage array, a network resource, a compute device, and/or any combination thereof. For example, the computing resource 108 may comprise one or more physical resources and/or virtual resources of a converged infrastructure.

In a specific example, multiple computing resources 108 may be provided by a converged infrastructure (CI). The computing resources 108 may include hardware resources (e.g., hosts 206) and/or virtual resources (e.g., virtual machines 208a, virtual switches 208b, and/or virtual storage objects 208c) executed by the hosts 206 of the converged infrastructure (See FIG. 2). In this case, the CI may include thousands of physical objects that each executes tens or even hundreds of virtual objects. Logging consumption data for this quantity of resources using instantaneous measurements of consumption levels with sufficient granularity (e.g., fidelity) is essentially prohibitive due to the sheer quantity of resources to be monitored. To solve this problem, conventional capacity management tools compress or otherwise average sets of obtained measurements to reduce the amount of memory used. Nevertheless, the compression of this data often removes useful information associated with peak consumption that is often incurred during the typical operation of a converged infrastructure. In some aspects, embodiments of the present disclosure provide a mechanism for maintaining historical threshold crossing event records and presenting information associated with the consumption in a manner that simplifies the understanding of usage trends, and a mechanism for compressing data that enables a reasonable approximation of historical consumption curves to be re-created, which may reduce the risk of over-consumption.

The consumption level of a computing resource 108 (e.g., a computing device or a resource of a computing environment, such as a CI) generally refers to a proportional level at which the computing resource is operating relative to the maximum operating level of the resource. For example, a processor having a 50 percent consumption level is considered to operating at 50 percent of its maximum capability. Multiple characteristics of the computing resource 108 may be monitored to determine its consumption level. In one embodiment, the capacity management application 104 may monitor a load of the processor of the computing resource 108 to determine its consumption level. In another embodiment, the capacity management application 104 may monitor a usage of the memory of the computing resource 108 to determine its consumption level. In another embodiment, the capacity management application 104 may monitor a network bandwidth consumed by the computing resource 108 to determine its consumption level. In another embodiment, the capacity management application 104 may monitor a level of heat and/or a level of power usage consumed by the computing resource to determine its consumption level. Nevertheless, it should be understood that other characteristics of the computing resource 108 may be monitored to determine its consumption level without departing from the spirit and scope of the present disclosure.

Rather than attempting to identify usage trends by using a statistical analysis of multiple measurements, where some of those measurements may be contaminated through compression, embodiments of the present disclosure identify the a time that a particular consumption indicator crosses a specified consumption level threshold, and either the duration it remains above the consumption level threshold, or the date and/or time the indicator crossed the threshold level in the opposite direction. An increasing quantity and/or duration of spikes above each consumption level threshold is an indication of increased consumption, and when a specified quantity/duration threshold is reached (e.g., a processor running at 80 percent (%) of maximum capacity for more than 5 minutes), the capacity management application 104 may store the threshold crossing event in the data source 106. In some embodiments, the capacity management application 104 may also request that a remediation system perform one or more remedial actions to compensate for the changes in the quantity/duration threshold.

Embodiments of the present disclosure may provide a variety of advantages not heretofore recognized by conventional capacity management systems. For example, maintaining a database of instances when consumption crosses a particular threshold, either increasing or decreasing, may require less storage than conventional approaches that maintain all measurements, but unlike compressed data, a reasonable reproduction of the actual consumption curve may be estimated. The use of threshold crossing events may enable relatively good granular consumption information to be retained for long periods of time, thus enhancing the ability of analysis to identify trends. Additionally, future analysis of the transition events that have occurred provide insight into the consumption peaks and usage levels of the monitored resources.

Another advantage may be one in which the system maintains historical consumption data that may be used to assess a potential impact of a black-swan event. A black-swan event generally refers to an event that comes as a surprise, has a major effect, and is often inappropriately rationalized after the fact with the benefit of hindsight. In such a case, embodiments of the present disclosure may allocate the appropriate amount of investment to manage such events, including whether the environment can absorb increased demand of current resources to manage such an event or the extent of new resources that may be required.

In one embodiment, the capacity management application 104 may record the time that a resource metric crossed a particular threshold when that metric was increasing or decreasing. The times of these events may be used to calculate the amount of time that a particular metric exceeded a particular threshold, and the number of times in a time period that exceeded that threshold. For example, the number of times in a particular day that a threshold was exceeded.

In one embodiment, the capacity management application 104 may record consumption metrics associated with a date and time that a consumption level of the computing resource crosses beyond multiple threshold levels. For example, the capacity management application 104 may log an event and/or a date and time that the consumption level of a consumption level crosses beyond multiple threshold levels (e.g., 60%, 75%, 85%, 95% and 99%). These events can be used to assess how many times consumption level crossed a particular threshold during a specified time period, and/or the time it remained above that threshold. This technique may provide a relatively efficient means of storage to maintain extensive historical information in such a way that consumption curves may be regenerated to provide trend analysis over relatively long-duration timeframes.

Additionally, the capacity management application 104 may generate events (e.g., alerts), and may also generate reports for interpreting consumption, such as in terms of financial costs associated with ownership and maintenance of the computing resource. In one embodiment, the capacity management application 104 may provide an application program interface (API) so that other software tools can consume the derived information for other purposes, such as automatically implementing other remedial actions for any identified over-consumption or under-consumption of the resources 108.

In some cases, trends for either increased or reduced consumption of the computing resource may be easier to identify because the number of times a particular value crossed a threshold increased (or decreased), or because the duration for which the consumption level was above a threshold is increasing (or decreasing) are specific numbers, eliminating the need to undertake mathematical models to identify trends. Also, quantifying threshold crossings of consumption levels may provide easier analysis than attempting to fit a pattern curve to a noisy data set that varies over multiple time periods. In this manner, embodiments of the present disclosure may enable a better analysis of consumption and how it varies over various time periods, help identify areas of over-consumption or under-consumption, and provide advance warning of potential an excessive consumption condition in a storage efficient manner.

The threshold values may be selected or defined according to any desired criteria. In one embodiment, the threshold values are defined empirically. That is, the threshold values may be based on past performance associated with the manner in which the computing resource handles the consumption of certain services. Additionally, the threshold values may be adjusted or changed over time to tailor (e.g., tune) the results provided by the selected threshold values. In an example scenario, a customer is licensed to a use a virtual local area network (VLAN) in a computing environment where multiple VLANs may share a common physical network connection. In this case, the customer may select one or more threshold values appropriate for the type of applications executed on the VLANs. That is, the customer may choose the threshold values based upon desired performance goals of the applications when used on the VLANs. Additionally, the customer would receive reports demonstrating the number of times and the length of time the consumption of a particular resource exceeded the requested threshold.

If the computing resource 108 comprises an object of a distributed computing environment, such as a converged infrastructure, the resources of the distributed computing environment may represent hardware resources, software resource, and/or one or more virtual objects executed on those hardware resources, which may be implemented in a virtual computing environment, either physical or one providing virtualized resources using techniques such as virtualization. The virtual computing environment may be embodied in any computing system that provides bare metal computing devices, where the applications and operating system is executed directly on the compute resources, or virtualized components (virtual objects) executed on one or more physical hosts.

Resources of a converged infrastructure may include resources, such as data processing devices, data storage devices, servers, networking equipment, and/or other computing devices. A converged infrastructure includes a combination of these devices that are packaged and interconnected in a standardized manner for ease of maintenance and use. For example, a converged infrastructure 200 such as that shown in FIG. 2 includes components found in Vblock™ System infrastructure packages available from VCE, LLC, which is located in Richardson, Tex. Converged infrastructures are often implemented in environments where relatively high reliability and/or availability are desired, such as in an enterprise environment. Nevertheless, it is contemplated that any computing environment, such as a computer cluster, computing grid, blade array, and/or other computing infrastructure may be configured using the teachings of the present disclosure.

The capacity management application 104 and the computing resource 108 communicate with one another using a communications network 118. Nevertheless, the capacity management application 104 and the infrastructure 108 may communicate with one another in any suitable manner. For example, the management computing system 102 and the computing resource 108 may communicate with each other using wireless, wired, and/or optical communications. In one specific embodiment, the capacity management computing system 102 and the converged infrastructure 200 communicates with one another using a communication network 118, such as the Internet, an intranet, or other wired and/or wireless communication networks. In another embodiment, the management computing system 102 and the computing resource 108 communicate using any suitable protocol or messaging scheme. For example, these networks may communicate using a Hypertext Transfer Protocol (HTTP), extensible markup language (XML), extensible hypertext markup language (XHTML), or a Wireless Application Protocol (WAP) protocol. Other examples of communication protocols exist. For example, the systems may communicate without the use of a separate or a distinct network. Additionally, other embodiments contemplate that the modules employed by the capacity management application 104 are executed by a computing device configured on the converged infrastructure 200.

The data source 106 stores threshold crossing event records 114, and consumption threshold level files 120. The threshold crossing event records 114 stores threshold crossing events indicating what consumption thresholds were crossed and the time that the consumption thresholds were crossed. The consumption threshold level files 120 include consumption threshold values that are used by the capacity management application 104. For example, the consumption threshold level files 120 maintain threshold information indicating upper and lower limits for one or more threshold values as described above. Nevertheless, the data source 106 may store any suitable type of information for capacity analysis of the converged infrastructure 104. Although the data source 106 is shown as being located on, at, or within the computing system 102, it is contemplated that the data source 106 can be located remotely from the computing system 102, such as on, at, or within a memory of host or virtual object of a converged infrastructure.

Figure 2A:
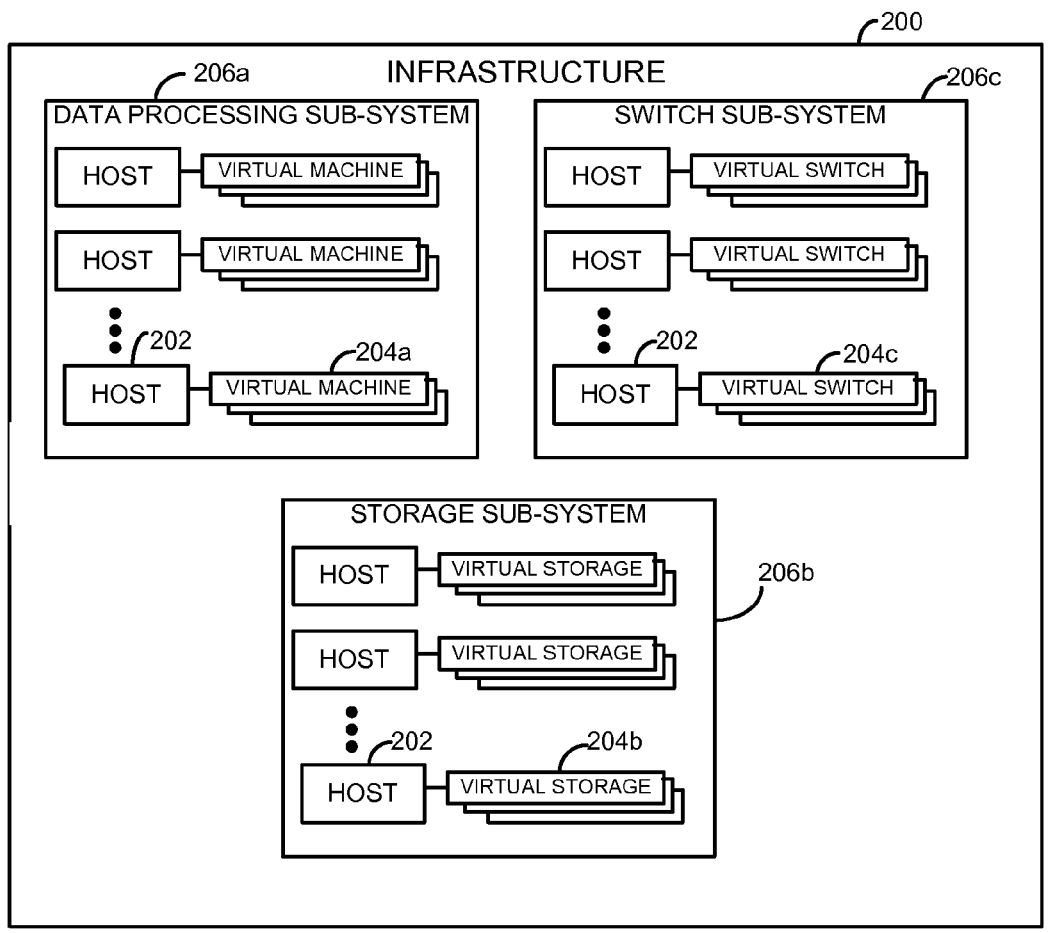
FIGS. 2A and 2B illustrate an example converged infrastructure that may be managed by the capacity management system according to one embodiment of the present disclosure.

FIG. 2A illustrates an example converged infrastructure 200 that may provide multiple computing resources 108 to be monitored by the system 100 according to the teachings of the present disclosure. The converged infrastructure 200 may be any type having multiple hosts 202 that each executes an operating system and/or a hypervisor. In the case that a hypervisor is executed, the host 202 will execute one or more virtual objects (e.g., virtual machines 204a, virtual storage objects 204b, and virtual switch objects 204c). The hosts of a converged infrastructure are often referred to as compute servers. Nevertheless, a 'host' may be any physical device and/or component that support the operation of virtual resources and services provided by those virtual resources. The particular converged infrastructure 200 as shown includes several sub-systems, such as a data processing sub-system 206a, a data storage sub-system 206b, and a switch sub-system 206c. Nevertheless, it should be understood that other converged infrastructures 104 may include additional, fewer, or different types of sub-systems without departing from the spirit and scope of the present disclosure.

In one aspect, the data storage sub-system 206b includes computer-readable memory structures for storing data used by the converged infrastructure 200, which may include network attached storage (NAS) arrays and/or storage area network (SAN) arrays that are facilitated by multiple virtual objects (e.g., virtual storage objects 204b). The switch sub-system 206c provides for communication among the various sub-systems of the converged infrastructure 200, and may include components, such as fabric interconnect systems, Ethernet switches/routers, multilayer director switches (MDSs), and the like. The data processing sub-system 206a executes applications that access, store, and otherwise manipulate data stored by the converged infrastructure 200. For a particular example, either of the data storage sub-system 206b, the switch sub-system 206c, and/or the data processing sub-system 206a may comprise a blade computing platform having multiple hosts (e.g., blade computing devices) 106 that each executes one or more virtual objects.

Each sub-system includes multiple hosts 202 that each executes one or more virtual objects, which in this particular example, are virtual machines (VMs) 204a, virtual storage objects 204b, and virtual switch objects 204c. For example, virtual objects, such as the VMs 204a may include software-based operating systems that are emulated on their respective hosts, which are physical computing devices. For each host, its respective VMs may be managed by a hypervisor that provides a virtual architecture for each VM's operation and controls various aspects of their operation. One example of a suitable hypervisor includes the VMWARE ESX™ software suite that is available from VMware Corporation, which is located in Palo Alto, Calif.

The capacity management application 104 (FIG. 1) may manage various activities of the computing resources 108 of the converged infrastructure 200. For example, the capacity management application 104 manages the allocation and de-allocation of resources, such as hosts and virtual objects used by the system. Additionally, the capacity management application 104 may manage the remediation of failures in the system by monitoring the health of each resource and performing corrective measures, such as migration (e.g., failover) to different resources in the event that certain resources have failed. The file system manager 108 may also control one or more aspects of the resources (e.g., hosts and virtual objects) used by the converged infrastructure 200. Any suitable type of file system manager may be implemented with the teachings of the present disclosure. In one embodiment, the system 100 includes a VSPHERE™ software suite that is available from VMware Corporation, which is located in Palo Alto, Calif.

Figure 2B:
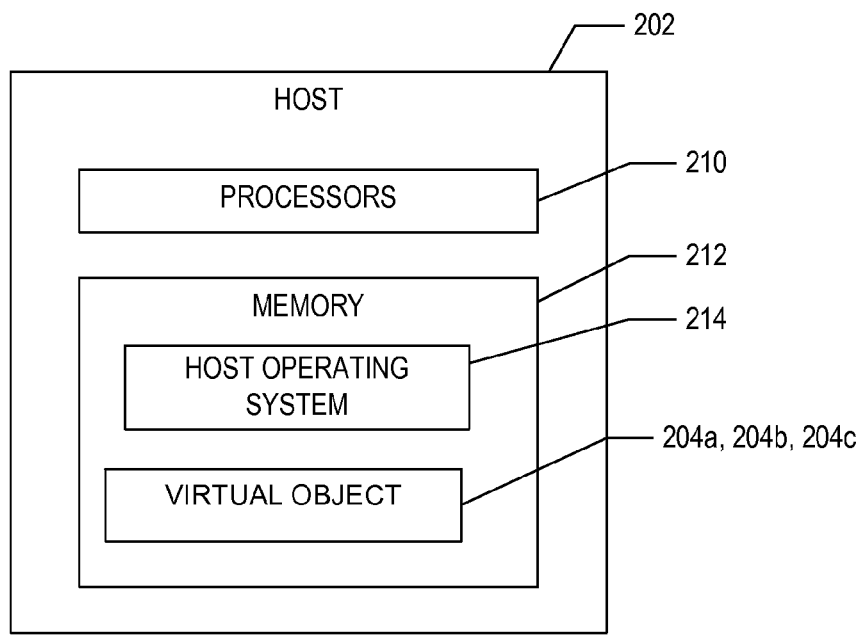

FIG. 2B illustrates an example host 202 implemented on each converged infrastructure 200 according to one aspect of the capacity management system 100. The host 202 is a computing or processing device that includes one or more processors 210 and a memory 212. For example, the host 202 can be a personal computer, such as a laptop or notebook computer, a workstation, or other processing device such as a personal digital assistant or a tablet computer. In a particular embodiment, the host 202 is a rack mounted host, such as blade host in which multiple blade hosts share a common backplane for communication with one another and for receiving power from a rack mounted power distribution unit. The memory 212 stores a host operating system 214 and one or more virtual objects (e.g., VMs 204a, virtual storage objects 204b, and virtual switch objects 204c) that are executed by the processor 210. The host operating system 212 controls and manages the operation of the virtual objects executed on the host 202. For example, control signaling for starting, stopping, and/or changing operating parameters of each virtual object is managed through the host operating system 212.

Figure 3:
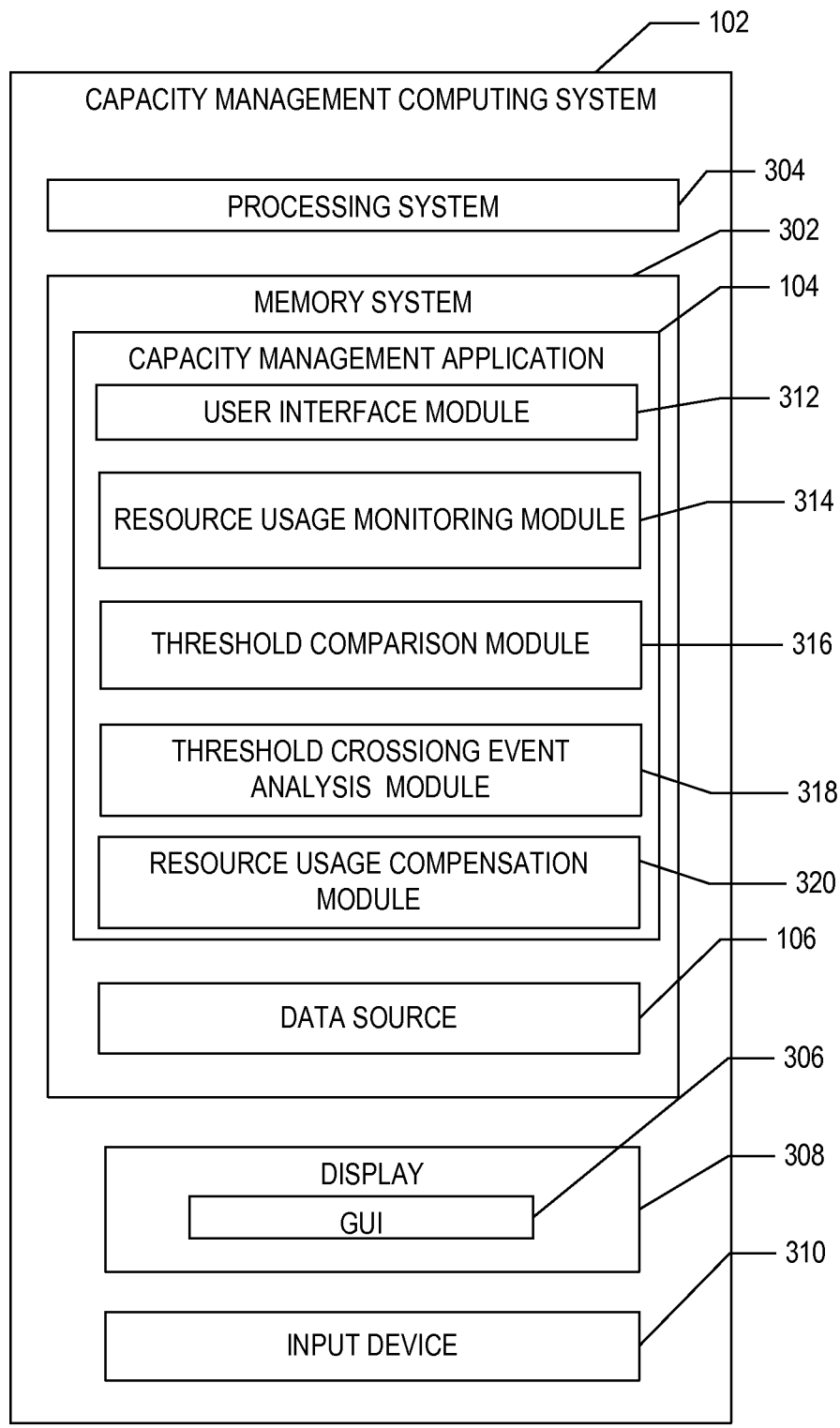
FIG. 3 illustrates a block diagram of an example capacity management application executed on the capacity management computing system according to one embodiment of the present disclosure.

Referring now in more detail to FIG. 3, a block diagram of an example capacity management application 104 executed on the capacity management computing system 102, is depicted according to one aspect of the present disclosure. The capacity management application 104 is stored in a memory 302 (e.g., computer readable media) and executed on a processing system 304 (e.g., computing unit) of the management computing system 102. The management computing system 102 may include any type of computing system, such as one or more management computing systems, personal computers, mobile computers and/or or other mobile devices, and other hosts.

According to one aspect, the capacity management computing system 102 also includes a graphical user interface (GUI) 306 displayed on the display 308, such as a computer monitor, for displaying data. The capacity management computing system 102 also includes an input device 308, such as a keyboard or a pointing device (e.g., a mouse, trackball, pen, or touch screen) to enter data into or interact with the GUI 306. According to one aspect, the capacity management application 104 includes instructions or modules that are executable by the processing system 302 as will be described in detail herein below.

The memory 302 includes volatile media, nonvolatile media, removable media, non-removable media, and/or another available medium. By way of example and not limitation, non-transitory computer readable medium comprises computer storage media, such as non-transient storage memory, volatile media, nonvolatile media, removable media, and/or non-removable media implemented in a method or technology for storage of information, such as computer readable instructions, data structures, program modules, or other data.

A user interface module 312 facilitates the receipt of input data and/or output data from or to a user. In one example, the user interface module 312 displays consumption information associated with the resource 108. The user interface module 312 displays one or more selectable fields, editing screens, and the like for receiving the information from the user, such as one or more threshold values that may be selected and edited by the user.

A consumption monitoring module 314 monitors the consumption of the resource 108. For example, the consumption monitoring module 314 may monitor the consumption of each resource of the computing environment by communicating with an application, such as a task manager that continually monitors processing load and memory usage, to obtain consumption characteristics of each resource. As another example, the consumption monitoring module 314 may monitor a network analyzer, such as a sniffer device, to measure a throughput rate of data on a communication link to estimate a processing load for resources that use that communication link. It should be appreciated that the system may monitor multiple other metrics in addition to those used in this example.

A threshold comparison module 316 determines whether any monitored metrics have crossed a threshold, and if so, stores the transition time, the direction (whether the metric was increasing or decreasing in events in the Threshold Crossing Event records 114 for analysis at a later time. That is, the threshold comparison module 316 determines, for each monitored usage characteristic, whether any monitored usage characteristics have exceeded or undershot an associated threshold values, and stores the event when the threshold value was crossed. In one embodiment, the threshold comparison module 316 also stores a date and time that the workload usage value remains above or below the specified threshold value.

A event analysis module 318 analyzes the events stored in the data source 106 to determine one or more trends in the consumption of the resources associated with the events. In one embodiment, the event analysis module 318 performs a mathematical modeling using the events stored in the Threshold Crossing Events records to generate a graph indicating the change in the usage of a particular resource over an extended period of time. Other mathematical techniques may be implemented. For example, the event analysis module 318 may perform a Gaussian regression technique to determine any normal distribution metric information that may be derived from the peak usage events over an extended period of time. In another embodiment, the period of time used for analysis of the events may be automatically selected by the event analysis module 318 or manually by the user. For example, the event analysis module 318 may iteratively apply varying periods of time to a set of events until a graph is derived having sufficient information or variability that may be used for providing useful information to the user.

A resource usage compensation module 320 may be used to perform one or more remedial actions to compensate for changes in the workload usage of the resources. For example, the resource workload usage compensation management module 320 may generate an alarm, such as an alert message, and SMS text, an email, illuminate a light, an audible sound, and the like when a trend exceeds a specified trend threshold value. The alert message may include, for example, a recommendation to add additional resources to the tasks assigned to the affected resource. Such alert messages may be useful for long term planning where the additional resources may be provided by new hardware components not presently available in the computing environment 108. For example, the resource usage compensation module 320 may periodically generate a report that compares the derived trends with one or more financial characteristics (e.g., cost of maintaining and operating the computing environment) associated with use of the computing environment 108.

In one aspect, the resource usage compensation management module 320 compares the derived trend values for a particular resource with one or more trend threshold values stored in the memory and allocates additional resources (e.g., virtual objects) when the trend values exceed an upper limit, or exceeds an upper limit for a specified time, and de-allocates resources when the trend value goes below another lower limit, or when it drops below a lower limit for a specified time. Such a technique may be useful for short term management when workload usage may change substantially over a relatively short period of time, such as changes that may be incurred in overnight conditions.

The resources may be adjusted in any suitable manner. For example, a virtual object of a computing environment 108 may be adjusted by adding one or more virtual processors and/or virtual memory when the trend value increases and deleting one or more virtual processors and/or virtual memory when the processing load decreases. As another example, the resource usage compensation management module 320 may adjust the resources by the allocation or de-allocation of additional resources to a group of resources assigned to a particular task. In a particular example in which three resources have been assigned to perform a certain task, the resource usage compensation management module 320 may allocate another host or virtual object to the group to form a group of four virtual objects assigned to performing that task, or may allocate additional bandwidth to a switch port that is throttling network traffic. Conversely, the resource usage compensation management module 320 may de-allocate a host or virtual object from the group to form a group of two resources when the trend of the resources of the group goes down.

In one embodiment, the resource workload compensation module 320 may adjust the resources to maintain a specified service level agreement (SLA) parameter provided by the resources. For example, the group of resources may be assigned to perform a task for a customer in which the agreement specifies a certain level of throughput (e.g., bandwidth) be maintained. In this case, the resource workload usage compensation module 320 compare the derived trends of the resources of that group with trend threshold values associated with the agreed upon SLA and adjust the resources such that the parameters of the SLA is maintained.

It should be appreciated that the modules described herein are provided only as examples, and that the capacity management application 104 may have different modules, additional modules, or fewer modules than those described herein. For example, one or more modules as described in FIG. 3 may be combined into a single module. As another example, certain modules described herein may be encoded on, and executed on other computing environments, such as on one of the hosts 202 of a converged infrastructure 200 as described above with reference to FIGS. 2A and 2B.

Figure 4:
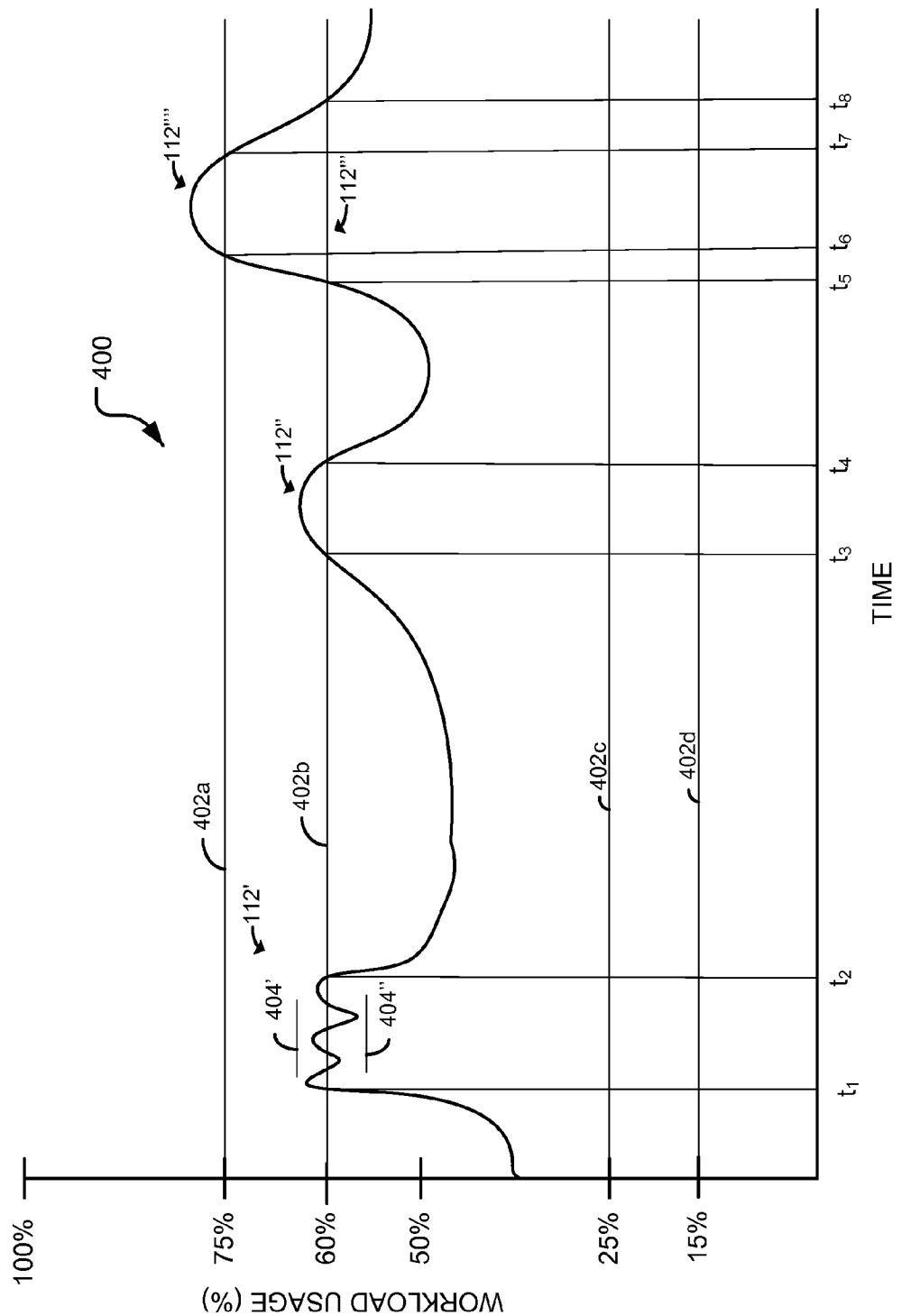
FIG. 4 illustrates a graph showing an example consumption that may be incurred over an extended period of time by a computing resource according to one embodiment of the present disclosure.

FIG. 4 illustrates a graph showing an example workload usage that may be incurred over an extended period of time by a resource 110 executed in a computing environment 108 according to one embodiment of the present disclosure. For example, the usage graph may be associated with a processor usage level of a virtual switch object 206b that processes a routing function for routing packets to and from the storage sub-system of the computing environment 108. Nevertheless, it should be understood that the usage graph may be obtained from any resource of the computing environment. Additionally, although the usage indicates a processor usage level, other embodiments may monitor other characteristics of the resource, such as a memory usage level of the virtual switch object.

As shown, four threshold values are assigned to the processor usage characteristic of the virtual switch object. Specifically, a threshold level 402b is set to 60 percent, a second threshold level 402a is set to 75 percent. Additionally, third threshold level 402c is set to 25 percent while a fourth threshold level 402d is set to 15 percent.

As shown, from time $t_1$ to time $t_2$, a usage event 112' is identified. However, due to the fluctuating nature of the workload usage, it goes above and below the first threshold level 402a numerous instances over a relatively short period of time. In this case, the capacity management application 104 may implement a filtering technique such that only one peak usage event is identified and stored in the data source 106. For example, the capacity management application 104 may use a hysteresis function that will not cause identification of a second event until the usage level exceeds an upper hysteresis buffer level 404' and a lower hysteresis buffer level 404" (e.g., +/−2 percent) above and/or below, respectively, the first threshold level 402a. In this case, the duration of the usage event 112' is determined to be the duration that the buffer level is exceeded (e.g., $t_2-t_1$). Other techniques to filter fluctuating events may also be applied. In one embodiment, the record of the first event is immediately followed by another record that acts as a multiplier, in effect saying "the previous event is repeated 'n' times, where n is an integer number.

The usage continues until at time $t_3$, the workload usage exceeds the threshold level 402a. In this case, the capacity management application 104 identifies this condition as a usage event 112" and logs the event along with the time of the event in the data source 106.

The workload usage continues until at time $t_5$, the workload usage exceeds the threshold level 402a. Nevertheless, the workload usage continues to increase until it exceeds another threshold level 402b at time $t_4$. In this case, two events will be logged, a usage event 112''' with increasing value at time $t_6$, and another event with increasing value 112'''' a time $t_7$, followed by two different events with decreasing value at time $t_7$ and $t_8$. Such logging of multiple threshold crossing events may be useful for obtaining additional granularity or insight that would not otherwise be provided by an identification of only a single event. For example, identification of multiple peak usage events associated with a single may be used to determine not only an amount of time that the workload usage exceeded the first upper limit threshold, but also to what degree that the upper limit threshold was breached.

As can be seen, each identified event indicates a trend that may be used by the capacity management application 104 to perform one or more remedial actions for compensating for the identified trend. For example, the capacity management application 104 may generate an alarm to notify users that the resource may need to be provided with manual intervention, or the capacity management application 104 may add or delete additional resources to compensate for the trend.

Although the example workload usage graph shown above is described in the context of exceeding the limit threshold levels 402a and 402b, it should be understood that the capacity management application 104 may identify lower limit threshold crossings and perform one or more remedial actions to compensate for downward trends in the workload usage levels of the resource.

Figure 5:
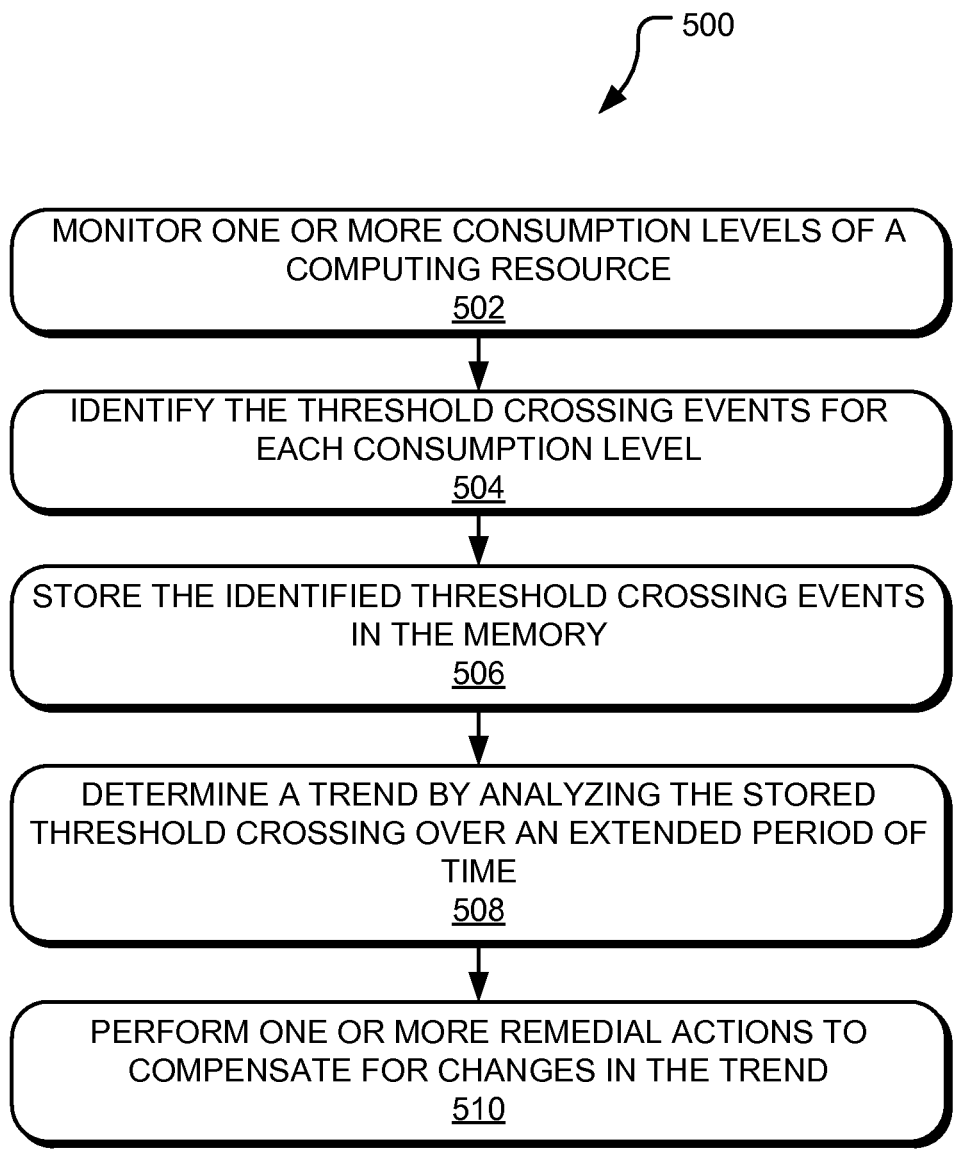
FIG. 5 illustrates an example process that is performed by the capacity management application according to one embodiment of the present disclosure.

FIG. 5 illustrates an example process 500 that is performed by the capacity management application 104 to manage the resources of a computing environment to compensate for changes in the trends of workload usage incurred by each resource according to one embodiment of the present disclosure.

In step 502, the capacity management application 104 monitors a usage level of the resources of a computing environment 200. The usage may be monitored via any suitable technique, such as by using a monitoring application, such as a task manager executed on the resource, or a network analyzer that that continually monitors throughput (e.g., bandwidth) of a communication link.

In step 504, the capacity management application 104 identifies each instance in which the workload usage exceeds a specified threshold level. In one embodiment, the capacity management application 104 identifies instances in which the workload usage exceeds multiple threshold levels, for example, one threshold level set to 50 percent and a second threshold level set to 65 percent. Additionally, the capacity management application 104 may implement a filtering mechanism, such as a hysteresis filter, to cancel noise that would otherwise be introduced by the workload usage fluctuating above and below the threshold value. For each of these identified instances, the capacity management application 104 stores the threshold crossing event in the data source 106 at step 506. In one embodiment, the capacity management application 104 may also store the date and time that the workload usage exceeds the threshold level.

In step 508, the capacity management application 104 determines a peak usage trend by analyzing multiple peak usage events that have occurred over an extended period of time. For example, the capacity management application 104 may determine a trend when the frequency of occurrence of the events increases over the extended period of time, or when the magnitude of the events increases or decreases over the extended period of time. In one embodiment, the capacity management application 104 applies a regression technique, such as a linear regression technique, to identify the trend. In another embodiment, the capacity management application 104 compares the determined trend against a trend threshold level 122 stored in the memory to determine that the trend has occurred.

In step 510, the capacity management application 104 may perform one or more remedial actions to compensate for changes to the determined trend. For example, the capacity management application 104 may generate an alarm, such as a light, an audible sound, and/or an alert message to indicate to personnel that a trend may require manual intervention of the affected resource. The alert message may also be coupled with financial report that associates the determined trend with any financial aspects of the resource or a group of resources for review by business enterprise that utilizes the resource(s). As another example, the capacity management application 104 may allocate or de-allocate additional resources when the trend shows increasing or decreasing demand, respectively. As another example in which the resources comprises virtual objects of a computing environment, the virtual objects may be adjusted by adding or deleting one or more virtual processors and/or one or more virtual memory units as the processing load on the virtual objects increases or decreases, respectively. Additionally, the capacity management application 104 the hardware resources (e.g., hosts) may be adjusted by adding or deleting one or more additional hardware resources as the processing load on the virtual objects increases or decreases, respectively.

The previous steps may be repeatedly performed for continual management of distributed computing tasks performed by the computing environment 108 to compensate for changes in workload usage of each resource 110 that executed the distributed computing task. Nevertheless, when use of the capacity management application 104 is no longer needed or desired, the process ends.

Although FIG. 5 describes one example of a process that may be performed by the capacity management application 104 to compensate for changes in various consumption levels of a computing resource, the features of the disclosed process may be embodied in other specific forms without deviating from the spirit and scope of the present disclosure. For example, the capacity management application 104 may perform additional, fewer, or different operations than those operations as described in the present example. As another example, the steps of the process described herein may be performed by a computing system other than the computing system 102, which may be, for example, one of the virtual objects executed on the virtual computing environment.

The description above includes example systems, methods, techniques, instruction sequences, and/or computer program products that embody techniques of the present disclosure. However, it is understood that the described disclosure may be practiced without these specific details.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium (e.g., floppy diskette), optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

Figure 6:
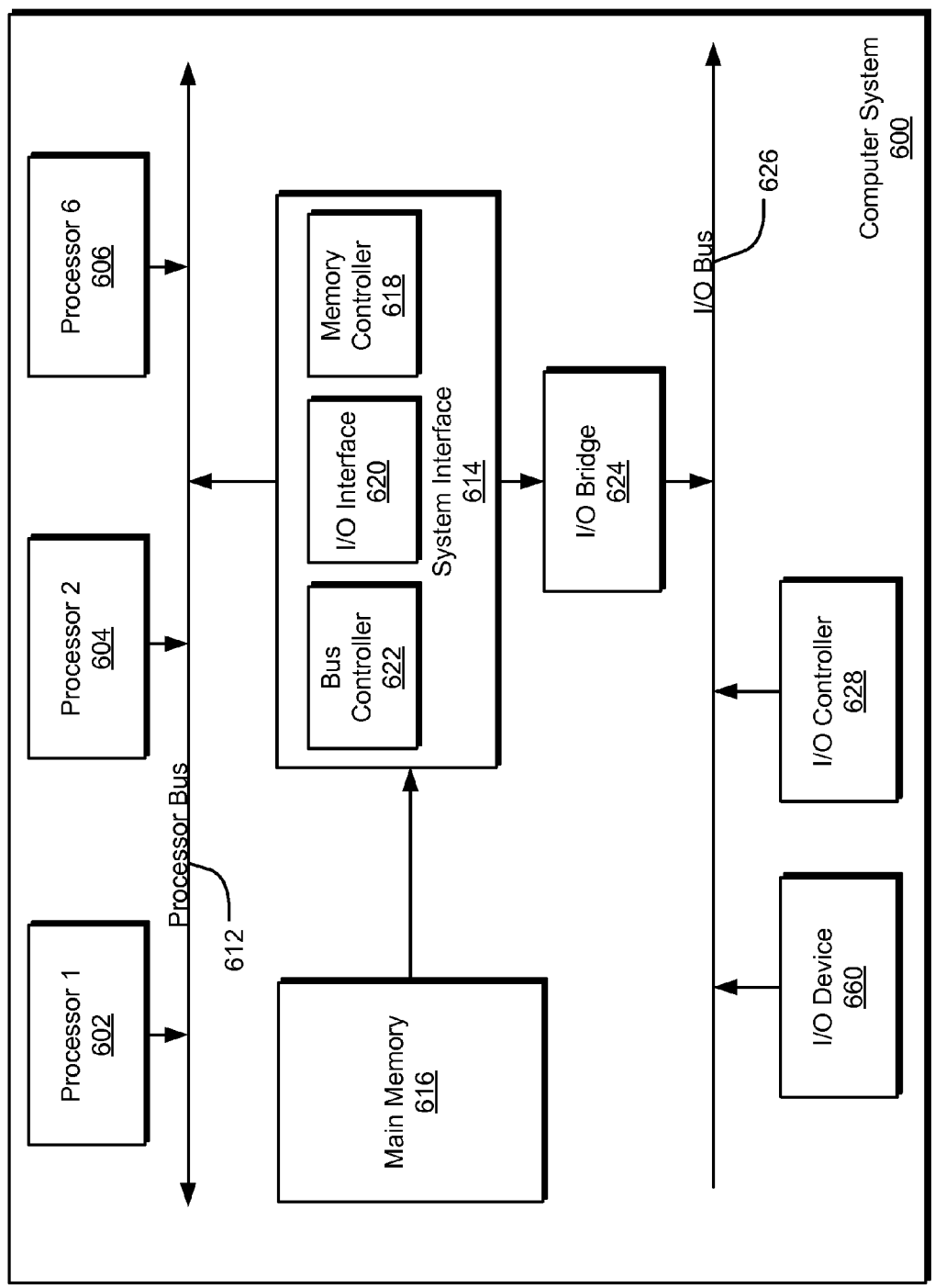
FIG. 6 illustrates an example computer system according to one embodiment of the present disclosure.

For example, FIG. 6 is a block diagram illustrating an example of a host or computer system 600 which may be used in implementing the embodiments of the present disclosure. The computer system (system) includes one or more processors 602-606. Processors 602-606 may include one or more internal levels of cache (not shown) and a bus controller or bus interface unit to direct interaction with the processor bus 612. Processor bus 612, also known as the host bus or the front side bus, may be used to couple the processors 602-606 with the system interface 614. System interface 614 may be connected to the processor bus 612 to interface other components of the system 600 with the processor bus 612. For example, system interface 614 may include a memory controller 613 for interfacing a main memory 616 with the processor bus 612. The main memory 616 typically includes one or more memory cards and a control circuit (not shown). System interface 614 may also include an input/output (I/O) interface 620 to interface one or more I/O bridges or I/O devices with the processor bus 612. One or more I/O controllers and/or I/O devices may be connected with the I/O bus 626, such as I/O controller 628 and I/O device 630, as illustrated.

I/O device 630 may also include an input device (not shown), such as an alphanumeric input device, including alphanumeric and other keys for communicating information and/or command selections to the processors 602-606. Another type of user input device includes cursor control, such as a mouse, a trackball, or cursor direction keys for communicating direction information and command selections to the processors 602-606 and for controlling cursor movement on the display device.

System 600 may include a dynamic storage device, referred to as main memory 616, or a random access memory (RAM) or other computer-readable devices coupled to the processor bus 612 for storing information and instructions to be executed by the processors 602-606. Main memory 616 also may be used for storing temporary variables or other intermediate information during execution of instructions by the processors 602-606. System 600 may include a read only memory (ROM) and/or other static storage device coupled to the processor bus 612 for storing static information and instructions for the processors 602-606. The system set forth in FIG. 6 is but one possible example of a computer system that may employ or be configured in accordance with aspects of the present disclosure.

According to one embodiment, the above techniques may be performed by computer system 600 in response to processor 604 executing one or more sequences of one or more instructions contained in main memory 616. These instructions may be read into main memory 616 from another machine-readable medium, such as a storage device. Execution of the sequences of instructions contained in main memory 616 may cause processors 602-606 to perform the process steps described herein. In alternative embodiments, circuitry may be used in place of or in combination with the software instructions. Thus, embodiments of the present disclosure may include both hardware and software components.

A computer readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 616. Common forms of machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

Embodiments of the present disclosure include various operations or steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A capacity management method comprising:
    monitoring, using executable instructions stored in a non-transitory storage medium and executed on at least one processor, a consumption level of a computing resource;
    identifying, using the executable instructions, each instance in which the consumption level crosses beyond at least one of a plurality of threshold levels of the consumption level, wherein each threshold level differs from one another, each instance defining a usage event, wherein at least one specified threshold level comprises a hysteresis function having an upper buffer level greater than the at least one specified threshold level and a lower buffer level less than the at least one specified threshold level, the upper buffer level and the lower buffer level limiting identification of another usage event to when the monitored consumption level exceeds the upper buffer level or when the monitored consumption level goes below the lower buffer level;
    storing, using the executable instructions, a plurality of the identified usage events in the non-transitory storage medium;
    estimating, using the executable instructions, a trend in the monitored consumption level according to a quantity of the plurality of stored usage events; and
    performing, using the executable instructions, one or more remedial actions on the computing resource to compensate for changes in the trend of the consumption level.

2. The capacity management method of claim 1, further comprising storing information associated with a stored date and time that the consumption level crosses beyond at least one of the plurality of threshold levels, and estimating the trend according to the stored date and time.

3. The capacity management method of claim 1, wherein one of the remedial actions comprises at least one of adding one or more resources, removing one or more resources, or modifying the one or more resources according to the estimated trend.

4. The capacity management method of claim 1, further comprising facilitating generation of a financial report for the computing resource according to the estimated trend.

5. The capacity management method of claim 1, wherein the monitored consumption level comprises at least one of a processing load of a processor of the computing resource, a memory usage of a memory allocated to the computing resource, a network bandwidth of a communication link associated with the computing resource, an operating temperature of the computing resource, a storage input/output operations per second (IOPS), and a power usage level of the computing resource.

6. The capacity management method of claim 1, further comprising applying the hysteresis function to cancel noise introduced proximate the at least one specified threshold level.

7. A capacity management system comprising:
    a computing device comprising at least one computing unit and at least one non-transitory storage medium to store executable instructions that are executed by the at least one computing unit to:
        monitor a consumption level of a computing resource;
        identify each instance in which the consumption level crosses beyond at least one of a plurality of threshold levels of the consumption level, wherein each threshold level differs from one another, each instance defining a usage event, wherein at least one specified threshold level comprises a hysteresis function having an upper buffer level greater than the at least one specified threshold level and a lower buffer level less than the at least one specified threshold level, the upper buffer level and the lower buffer level limiting identification of another usage event to when the monitored consumption level exceeds the upper buffer level or when the monitored consumption level goes below the lower buffer level;
        store a plurality of the identified usage events in the at least one non-transitory storage medium;
        estimate a trend in the monitored consumption level according to a quantity of the plurality of stored usage events; and
        perform one or more remedial actions on the computing resource to compensate for changes in the trend of the consumption level.

8. The capacity management system of claim 7, wherein the executable instructions are further executed to store information associated with a stored date and time that the consumption level crosses beyond the at least one of the plurality of threshold levels, and estimate the trend according to the stored date and time.

9. The capacity management system of claim 7, wherein one of the remedial actions comprises at least one of adding one or more resources, removing one or more resources, or modifying the one or more resource according to the estimated trend.

10. The capacity management system of claim 7, wherein the executable instructions are further executed to facilitate generation of a financial report according to the estimated trend.

11. The capacity management system of claim 7, wherein the monitored consumption level comprises at least one of a processing load of a processor of the computing resource, a memory usage of the non-transitory storage medium allocated to the computing resource, a network bandwidth of a communication link associated with the computing resource, an operating temperature of the computing resource, a storage input/output operations per second (IOPS), and a power usage level of the computing resource.

12. The capacity management system of claim 7, wherein the executable instructions are further executed to apply the hysteresis function to cancel noise introduced proximate the at least one specified threshold level.

13. Code implemented in a non-transitory, computer readable medium that when executed by at least one computing unit, is operable to perform at least the following:
    monitoring a consumption level of a computing resource;
    identifying each instance in which the consumption level crosses beyond at least one of a plurality of threshold levels of the consumption level, wherein each threshold level differs from one another, each instance defining a usage event, wherein at least one specified threshold level comprises a hysteresis function having an upper buffer level greater than the at least one specified threshold level and a lower buffer level less than the at least one specified threshold level, the upper buffer level and the lower buffer level limiting identification of another usage event to when the monitored consumption level exceeds the upper buffer level or when the monitored consumption level goes below the lower buffer level;
    storing a plurality of the identified usage events in the computer readable medium;
    estimating a trend in the monitored consumption level according to a quantity of the plurality of stored usage events; and
    performing one or more remedial actions on the computing resource to compensate for changes in the trend of the consumption level.

14. The code of claim 13, further executed to store information associated with a stored date and time that the consumption level crosses beyond the at least one of a plurality of threshold levels, and estimate the trend according to the stored date and time.

* * * * *